United States Patent [19]
Roach et al.

[11] 3,905,683
[45] Sept. 16, 1975

[54] DEFORMABLE MIRROR LIGHT VALVE FOR REAL TIME OPERATION

[75] Inventors: William Ronald Roach, Rocky Hill; Lynne Darcy, Princeton, both of N.J.

[73] Assignee: RCA Corporation, New York, N.Y.

[22] Filed: May 23, 1974

[21] Appl. No.: 472,630

[52] U.S. Cl. .................................. 350/161; 313/465
[51] Int. Cl.² .......................................... G02F 01/00
[58] Field of Search ..................... 350/161; 313/465

[56] References Cited
UNITED STATES PATENTS

| | | |
|---|---|---|
| 2,896,507 | 7/1959 | Mast et al. ........................ 353/85 X |
| 3,137,762 | 6/1964 | Baumgartner et al. .............. 350/161 |
| 3,626,084 | 12/1971 | Wohl et al. ...................... 350/161 X |

*Primary Examiner*—Robert Segal
*Attorney, Agent, or Firm*—Glenn H. Bruestle; Donald S. Cohen; Carl L. Silverman

[57] ABSTRACT

The elastomer layer of a deformable mirror light valve has a resistivity such that a carrier moves through the photoconductor layer and the elastomer layer causing the projected image to rise and fall within real time rates. The elastomer layer includes a resistivity modifier.

1 Claim, 2 Drawing Figures

DEFORMABLE MIRROR LIGHT VALVE FOR REAL TIME OPERATION

BACKGROUND OF THE INVENTION

The present invention relates to a deformable mirror light valve capable of projecting a real time display, and particularly to such a light valve with an elastomer layer having a particular resistivity.

Deformable mirror light valves are well known devices capable of amplifying the light intensity of an optically projected image, e.g., U.S. Pat. No. 2,896,507 entitled, "Arrangement for Amplifying the Light Intensity of an Optically Projected Image," issued to F. Mast et al., July 28, 1959. Generally, the devices are layered structures including a transparent conductor layer, a photoconductor layer, an elastomer layer, a thin flexible layer of conductive metal and a means of placing a voltage across the transparent conductor layer and the flexible layer of conductive metal. A light image absorbed by the photoconductor layer generates electron-hole pairs. The voltage applied across the transparent conductor layer and the thin flexible metal layer causes the mobile carriers to drift in the photoconductor layer. As the oppositely charged carriers separate, a nonuniform charge pattern is formed, thereby causing the thin flexible metal layer to deform.

For such a deformable mirror light valve to be capable of projecting a real time image, the sum of the rise and fall time of the projected image should be approximately 1/30 of a second. A shorter time results in a reduction of the brightness of the projected image, a longer time results in blurring of the projected image. The rise time of the projected image is determined by the drift time of the carriers in the photoconductor layer. The drift time through the photoconductor layer can be made to be approximately 1/100 of a second. Under a constant Direct Current (DC) bias condition, the fall time of the projected image is determined by the time necessary to remove the carriers deposited at the interface between the photoconductor layer and the elastomer layer.

Present methods of maintaining the sum of the rise and fall time of the projected image at approximately 1/30 of a second includes the use of Direct Current (DC) biasing, with reverse bias erasure as well as the use of Alternating Current (AC) biasing. The present methods, although capable of operating a deformable mirror light valve at real time rates, have one property in common; all require a rather complicated biasing system. Furthermore, both biasing systems would be undesirable where the image is read into the deformable mirror light valve in a scanned raster type pattern since each point in the pattern will not be read in at the optimum time during the biasing cycle. It would therefore be desirable to develop a deformable mirror light valve capable of real time operation with a simple biasing voltage, e.g., a constant (DC) voltage.

SUMMARY OF THE INVENTION

A deformable mirror light valve having a transparent substrate and a transparent conductor layer covering one surface of the substrate. A photoconductor layer is on the transparent conductor layer and an elastomer layer is on the photoconductor layer. A mirror layer covers the elastomer layer. The deformable mirror light valve is improved by the employment of an elastomer layer having a resistivity which permits a carrier to move through the photoconductor layer and the elastomer layer within real time rates under a constant direct current biasing voltage.

DETAILED DESCRIPTION

Figure 1:
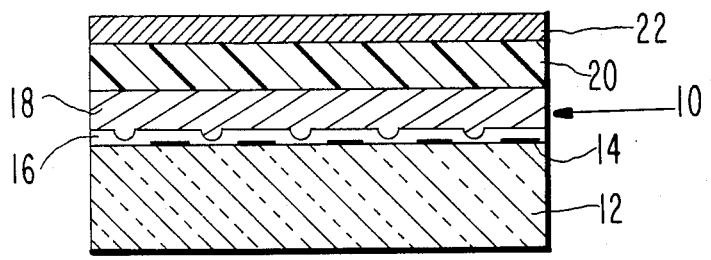
FIG. 1 is a cross-sectional view of one form of a deformable mirror light valve of the present invention.

Referring initially to FIG. 1, one form of a deformable mirror light valve of the present invention is designated generally as 10. The deformable mirror light valve 10 includes a transparent substrate 12, such as pyrex, having an optical grating 14 on one surface thereof. A chrome grating consisting of lines and spaces of equal width can serve as the optical grating 14. The optical grating 14 need not extend over the entire surface of the transparent substrate 12; it is sufficient if the grating 14 extends over the target area of the deformable mirror light valve, i.e., the area where the image is read in. A transparent conductor layer 16, such as TIC, a thin coating of tin oxide, covers both the grating 14 and the spaces defined by the grating 14. A photoconductor layer 18, such as poly(N-vinyl carbazole) doped with trinitrofluorenone, covers the transparent conductor layer 16.

An elastomer layer 20, of an electrical insulator, such as RTV silicone rubber, covers the photoconductor layer 18. Silicone rubber is often chosen for the elastomer layer as it meets the requirements for a deformable mirror light valve, such as sufficient elasticity and durability. However, due to the high resistivity of silicone rubber, approximately $10^{14}$ ohm-cm, its RC time constant is typically in seconds. Thus, real time operation of the deformable mirror light valve under a constant (DC) bias voltage is not feasible unless the resistivity of the silicone rubber is decreased so as to be within the range of approximately $10^{10}$ to $10^{12}$ ohm-cm. The resistivity of the silicone rubber can be decreased to the desired range through adding a resistivity modifier such as tetraheptyl ammonium chloride to the silicone rubber. The elastomer layer 20 is covered by a thin flexible conductive layer 22, hereinafter referred to as the mirror layer 22, which provides good optical isolation between the readout light and the address light. A deformable mirror light valve having such an elastomer layer, i.e., silicone rubber with a resistivity of approximately $10^{11}$ ohm-cm, has a fall time as low as 30 milliseconds so as to be capable of real time operation under a simple constant (DC) biasing voltage of 400 volts. The basic structure of the deformable mirror light valve of the prior art can be constructed as described in previously mentioned U.S. Pat. No. 2,896,507.

The improved deformable mirror light valve of the present invention can be fabricated by modifying the method of construction for the basic deformable mirror light valve of the prior art. For example, the elastomer layer 20 can be formed of silicone rubber, such as RTV 602, commercially available from General Electric and a diluent, such as RTV 910 also commercially available from General Electric. A resistivity modifier, such as tetraheptyl ammonium chloride, which is commercially available from Eastman Kodak, can be added to the rubber and the diluent in appropriate proportions so as to decrease the resistivity to the desired extent. A catalyst, such as SRC 04, also commercially available from General Electric is added to the mixture to cure the elastomer layer 20 to the desired degree. Such an elastomer layer of silicone rubber having a resistivity of approximately $10^{11}$ ohm-cm so as to be useful for real time operation can be fabricated by employing the following proportions; 50 grams of the silicone rubber, 10 grams of the diluent, 21 drops of the catalyst and 0.6 grams of tetraheptyl ammonium chloride.

Figure 2:
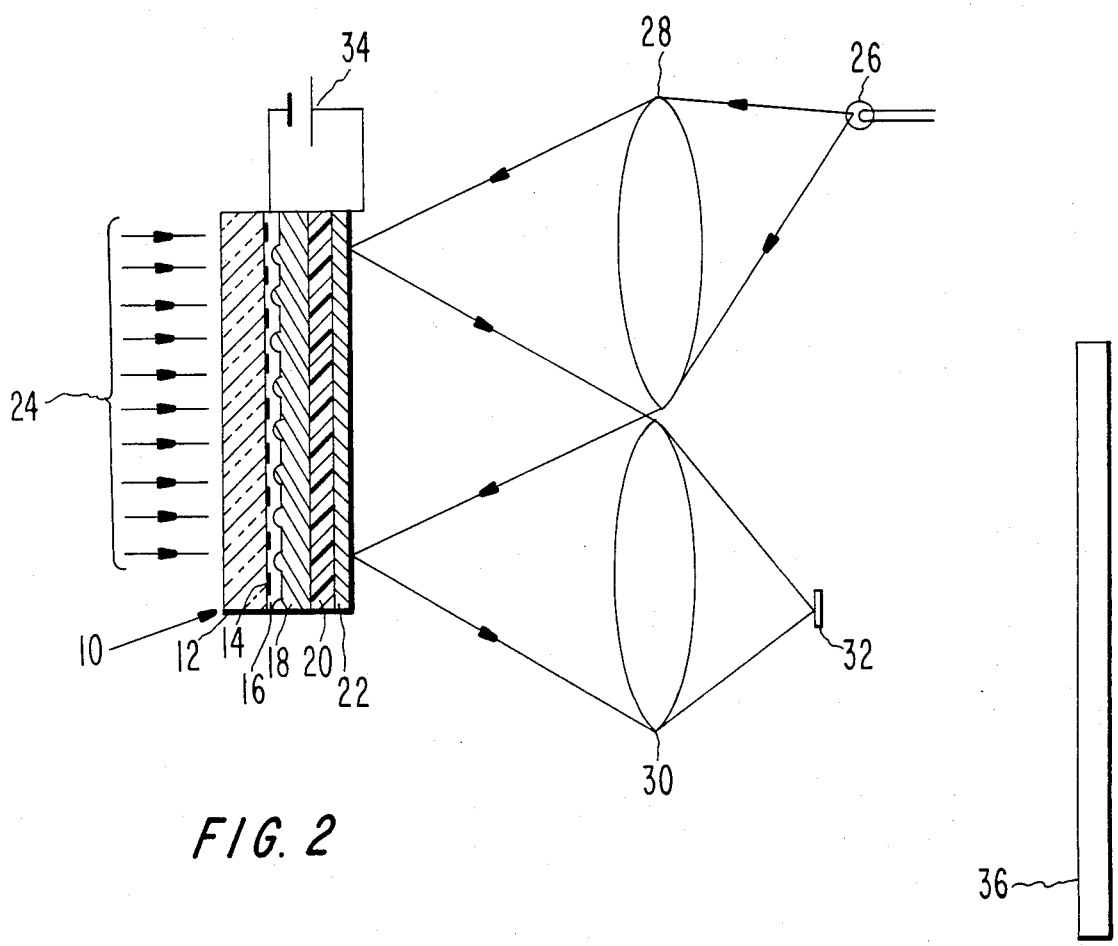
FIG. 2 is one form of a Schlieren optical system suitable for operating the deformable mirror light valve of the present invention.

The operation of the deformable mirror light valve 10, utilizes a Schlieren optical system, known in the art, such as the one described in FIG. 2. The deformable mirror light valve 10 is positioned wherein the addressing light 24 falls incident upon its substrate 12. The Schlieren optical system includes a high intensity projection lamp 26 which emits light toward a condensing lens 28 which then directs the parallel light toward the mirror layer 22 of the deformable mirror light valve 10. The parallel light striking the mirror layer 22 of the deformable mirror light valve 10 is reflected through a projection lens 30 and focussed on a Schlieren stop 32 as long as the parallel light from the condensing lens 28 strikes the mirrow layer 22 while the mirror layer 22 is flat. A biasing voltage 34 is applied across the transparent conductor layer 16 and the mirror layer 22 of the deformable mirror light valve 10. At each point where the addressing light 24 strikes the photoconductor layer 18, electron-hole pairs are generated. The pairs are separated by the electric field produced by the biasing voltage 34 thereby causing the mirror layer 22 of the deformable mirror light valve 10 to deform. Each deformation of the mirror layer 22 of deformable mirror light valve 10 causes the light reflected from the deformed mirror layer 22 to bypass the Schlieren stop 32 and fall upon a viewing screen 36.

Although the deformable mirror light valve of the present invention has been described having an elastomer layer of silicone rubber to which a resistivity modifier has been added, the deformable mirror light valve operates successfully at real time rates as long as the elastomer layer possesses sufficient elasticity and has a resistivity such that the sum of the drift time of the carriers through the photoconductor layer and the RC time constant of the elastomer layer is approximately 1/30 of a second.

We claim:

1. A deformable mirror light valve of the type having a transparent substrate, a transparent conductor layer covering one surface of said transparent substrate, a photoconductor layer on said transparent conductor layer, an elastomer layer on said photoconductor layer, and a deformable mirror layer on said elastomer layer, wherein the improvement comprises:

said elastomer layer comprising silicone rubber having a resistivity modifier to impart to said layer a resistivity in the range of approximately $10^{10}$ ohm-cm to $10^{12}$ ohm-cm whereby a carrier moves through said photoconductor layer and said elastomer layer within real time rates under a constant direct current biasing voltage.

* * * * *